Jan. 13, 1959      A. C. RUGE      2,868,535

MOTION LOAD WEIGHING SYSTEM

Filed Dec. 21, 1955

INVENTOR.
ARTHUR C. RUGE
BY
ATTORNEY

United States Patent Office 2,868,535
Patented Jan. 13, 1959

2,868,535

MOTION LOAD WEIGHING SYSTEM

Arthur C. Ruge, Lexington, Mass., assignor to Baldwin-Lima-Hamilton Corporation, a corporation of Pennsylvania Application December 21, 1955, Serial No. 554,504

5 Claims. (Cl. 265—71)

This invention relates to the weighing of vehicles or other objects which are to be weighed while moving, preferably under the influence of gravity, across an inclined support. Specifically, it relates to the weighing of railroad cars while in motion, although it is equally applicable to the weighing of packages passing over a conveyor scale, trucks and other vehicles, etc.

It is an object of my invention to provide improved automatic means for making the indication of in-motion weight independent of whether or not the moving object is accelerating or standing still. A further object is to provide purely mechanical compensating means for performing the necessary acceleration compensation function. Another object is to also provide electrical or other load-responsive means for performing such compensating function.

It is a well known fact that when an object is accelerating in a downward direction its apparent weight decreases by an amount proportional to the downward acceleration. When an object such as a railroad car rolls or slides under the influence of gravity over an inclined scale, the object may or may not accelerate in a downward direction, depending upon the retarding forces present, such as wheel friction, brake action, etc. If the retarding force is equal to the downward accelerating force then the object will cease to accelerate and will move with constant velocity across the scale. If the retarding force is greater than the accelerating force then the object will decelerate as it passes across the scale and may, in fact, come to a complete stop.

Other objects and advantages will be more apparent to those skilled in the art from the following description of the accompanying drawings in which.

Figure 1:
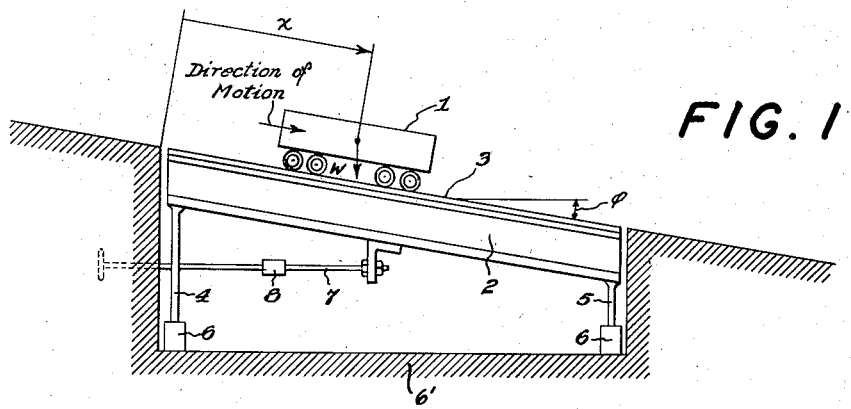
Fig. 1 is a schematic diagram of a weigh bridge and adjoining track rails together with the relationship of elements employed in my invention.

Fig. 1 shows schematically one preferred embodiment of my invention. A moving object 1 such as a freight car is rolled across a weighbridge 2, the rolling surface (or rail) 3 of which is inclined at an angle $\phi$ with the horizontal. For purposes of explanation, the weighbridge is shown supported by suitable struts 4 and 5 on four load-sensing means 6 located at each corner of the weighbridge, although more than four supports are frequently employed. For simplicity in the present analysis it will be assumed that struts 4 and 5 offer no horizontal restraint to motion of weighbridge 2, although this is not at all a necessary condition to the present invention. If the struts do offer some elastic resistance, such resistance results in a small proportional reduction in the load carried in element 8 which merely acts like a small change in sensitivity of element 8.

Load sensing elements 6 can be of any type such as electrical, hydraulic, pneumatic, electro-mechanical, etc. However, for purposes of clarity in the following description, elements 6 may be thought of as electrical load cells of the resistance wire strain gage type such as shown in principle, for example, in my Patent No. 2,561,318.

In order to provide lateral stability to a weighbridge structure it is common practice to provide a system of stayrods or stayplates which are anchored to the weighbridge and to the scale pit walls, such stay means being preferably designed so that they exert a negligible effect upon the weight force acting on the load-sensing device. The present invention is concerned only with the stay means operating in the longitudinal direction of the weighbridge since the transverse stay means are not affected by the apparent weight changes referred to above. In Fig. 1 a stayrod or stayplate 7 prevents longitudinal motion of weighbridge 2 as a result of forces such as braking and it is designed sufficiently flexible in the vertical direction that it does not sensibly affect the accuracy of the weighing. For the purposes of the present invention, stayrod 7 is provided with a load-sensing means 8 which again can be mechanical, electrical, pneumatic, hydraulic, etc. For purposes of explanation the load-sensing element or dynamometer 8 will be considered to be a resistance wire load cell capable of measuring the magnitude of the force carried by stayrod 7. The load cells 6 and 8 may be considered similar except that one is vertical and supported on its base $b$ and the other horizontal and inserted in the stayrod 7. Such cells consist of a column $c$ secured in a base $b$ and laterally guided by flex plates $d$ secured in a housing $e$ to which the base is secured. Bonded type resistance wire strain gages $s$ are mounted on the load column $c$. It will be seen that stayrod 7 and its dynamometer 8 are oriented in a horizontal plane which is the preferred form of the present invention. However, stayrod 7 can just as well be inclined to the horizontal in either direction at any desired angle without departing from the spirit of this invention. As a practical matter, stayrod 7 would normally be made substantially horizontal, but the fact that horizontality is not a necessary condition means that the results of the invention can be obtained without requiring precision in this regard. This will more clearly be seen in the following analysis.

Figures 2, 5:
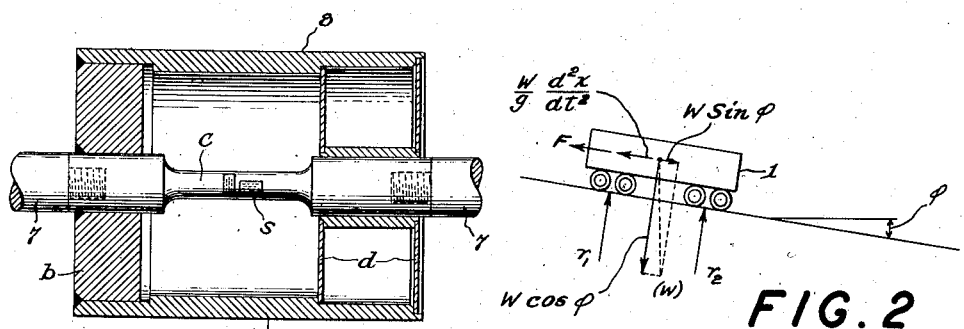
Fig. 2 illustrates the forces acting on a moving carrier down an incline.
Fig. 5 is a longitudinal section of a load sensing element or cell.

In order to understand the function of load-sensing element 8 of Fig. 1 (or the mechanical equivalent shown in Fig. 4 to be described later), consider first the forces acting on the moving car 1 of Fig. 2. There is the primary force of gravity W (dotted vector) which is in Fig. 2 resolved into component W sin $\phi$ acting parallel to the direction of motion of the car and W cos $\phi$ acting perpendicular to the same direction. If we assume the car is accelerating $$\frac{d^2x}{dt^2}$$

in the direction of motion of the car, then there is an inertia reaction $$\frac{W.d^2x}{gdt^2}$$

which is opposite in direction to the acceleration of the car. Also, if there is a retarding action due to friction of the axle, braking, etc. there will be a force F also opposite to the direction of motion of the car. Since there is no acceleration possible in a direction normal to the direction of motion, there will be forces $r_1$ and $r_2$ exerted by the weighbridge on the wheels such that the sum of these two forces is equal to $W \cos \phi$. These forces shown in Fig. 2 are the only forces that act upon the car and from them we can readily deduce the forces which act upon the weighbridge and the load-sensing elements 6 of Fig. 1, the load elements being supported on the foundation 6' which constitutes a fixed support.

While it would appear at first thought that the change in apparent weight of such an object going over the scale is most easily analyzed in terms of its acceleration, I prefer to consider the whole effect as being a matter of simple statics involving only the retarding force acting on the object and the weight of the object.

Figure 3:
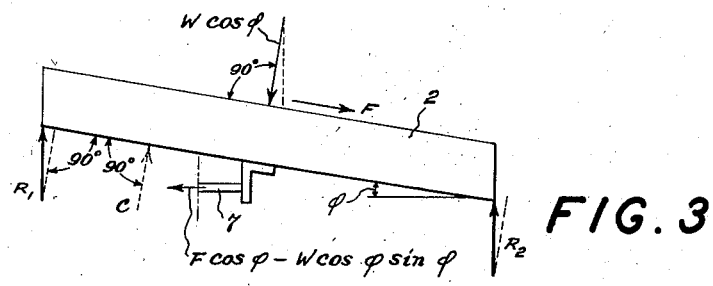
Fig. 3 shows the forces acting on the weigh bridge as a result of a moving carrier upon it.

In Fig. 3 are shown the forces which act on the weighbridge 2 of Fig. 1 as a result of presence of the moving car upon it. The forces due to the car are seen from the analysis of Fig. 2 to be only two; namely $W \cos \phi$ at right angles to the direction of motion, and the retarding or drag force F which acts on the weighbridge in the direction of motion since it is obviously opposite to the direction of the retarding force acting on the car in Fig. 2. Having arrived at these two forces acting on the weighbridge, it is a matter of simple statics to determine the reactions $R_1$, $R_2$ which represent the reactions carried to elements 6 of Fig. 1. Ignoring for the moment the compensating reaction C shown dotted in Fig. 3, it may be seen that the force acting on stayrod 7 (assumed horizontal for simplicity) is found by taking the sum of the horizontal components of the two forces acting on the weighbridge as a result of the presence of the moving car. This horizontal vector is seen to be $$F \cos \phi \text{ minus } W \cos \phi \sin \phi$$

since the sum of all horizontal forces acting on the structure must equal zero. The value of the total reaction acting on the load cells is most easily found by summing up the forces acting perpendicular to the direction of motion. From this we arrive at $$(R_1+R_2) \cos \phi = W \cos \phi + (F \cos \phi - W \cos \phi \sin \phi) \sin \phi$$

From this equation it will be seen that application of a compensating force C (shown dotted in Fig. 3) equal in magnitude to the second term of the right-hand side of the equation will serve to make the total load cell reaction independent of F. That is to say, if we take the force acting in stayrod 7, multiply it by $\sin \phi$ and apply it as a compensating force C we would arrive at the simple relationship $R_1$ plus $R_2$ equals W, which is the desired result.

In the embodiment shown in Fig. 1 this compensating effect is obtained by merely adding the force measured by element 8 multiplied by $\sin \phi$ to the sum of the forces measured by elements 6. This is particularly easy to do in the case of electrical strain gages since the outputs can be added in any proportion by conventional means as is well known. See, for example, Patent No. 2,590,946.

Figure 4:
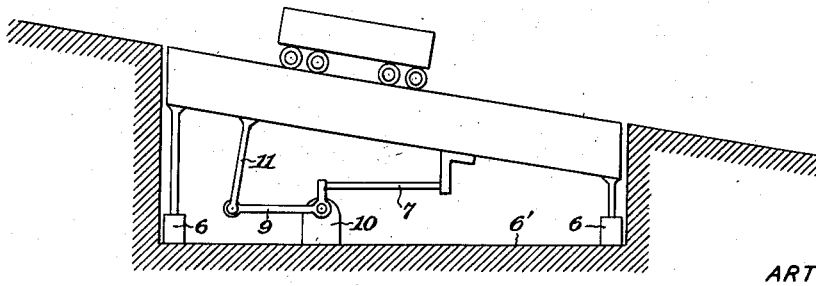
Fig. 4 illustrates the principles of my invention as employed in acceleration compensating means.

Fig. 4 shows how the identical result can be obtained through a simple mechanical linkage. Here, the force acting on stayrod 7 is transmitted to a bell crank 9 which is pivoted on a fixed support 10. The force required to restrain the other end of the bell crank 9 is transmitted to the weighbridge by a suitable member 11, thereby creating a reaction corresponding to the reaction C of Fig. 3. In this embodiment, if pushrod 7 is horizontal the arms of bell crank 9 are proportioned so that the force acting on 11 is equal to the force acting on 7 multiplied by $\sin \phi$. It will be recognized that there are a great many equivalent forms of linkages, levers, etc. which will perform the function illustrated in Fig. 4 and no attempt is here made to show more than one form to illustrate the basic principle. Any mechanical means engaging with stayrod 7 and adapted to transmit a force to the weighbridge proportional to the force on 7 having a vertical component of suitable magnitude to make $R_1+R_2$ independent of F, while at the same time restraining the weighbridge against longitudinal movements, will satisfy the condition. Thus it will be seen that the essential features of the present invention as applied broadly to both the Figs. 1 and 4 modifications are: a weighing device having an inclined surface over which an object to be weighed travels under the influence of gravity, substantially horizontal stay means for preventing movement of the weighing surface in the direction of its inclination, said stay means engaging the weighbridge and a fixed support independent of the weighbridge and being adapted to permit vertical deflections and movement of said weighbridge without causing appreciable error in the determination of the weight of said object, and load-sensing means supporting said weighbridge for determining the weight of said moving object and including cooperating means responsive to the force acting in said stay means to produce a motion compensating effect such that the determination of the weight of said object is made independent of forces resulting from its motion over said inclined surface.

In the embodiment shown in Fig. 1 the cooperation takes the form of the measurement of a compensating force by element 8 which is added by any convenient means to the force measured by elements 6. Whether this is done electrically, hydraulically, or by other means is incidental. In the embodiment shown in Fig. 4 the cooperation is effected by means of a physical force exerted against the weighbridge, said physical force having a vertical component of the proper magnitude to effect compensation, so that the force measured by elements 6 gives the desired result directly. It will be seen that the embodiment shown in Fig. 1 is particularly advantageous for use with sensing elements 6 of electrical, hydraulic, or pneumatic types, whereas the embodiment of Fig. 4 is particularly advantageous for use with mechanical scales of the lever or spring type although it is adapted for use with any type of load-responsive device that may be used for making the weighing.

With further reference to the mechanical system illustrated in Fig. 4, it should be noted that connecting element 11 need not be at right angles to the weighbridge as there shown but can be at any other angle to it, so long as it transmits the proper vertical component of the force to effect the desired compensation. This can be accomplished by suitable choice of the lever ratio of bell crank 9. The choice of linkages or lever arrangements for performing this function is very broad indeed, as will be evident to anyone skilled in the mechanical arts.

It will also be obvious to those skilled in the art that in the mechanical compensating means it is possible to avoid any frictional effects that might exist in moving pivots by substituting flexure pivots and this is preferred where high-precision weighing is involved. However, since it is not necessary to produce the compensating effect to high accuracy, it being already a small quantity, the simplest mechanical system will probably be adequate for most applications.

While in my illustration I have shown the weighbridge reactions as carried on vertical members such as 4, 5, 6 of Fig. 1, it will readily be seen that so far as the present invention is concerned, it makes no difference if these supports are inclined to the vertical. They might, for example, be placed at right angles to the weighbridge rails if the construction is simplified thereby without affecting the results of my compensating means.

It will, of course, be understood that various changes in details of construction and arrangement of parts may be made by those skilled in the art without departing from the spirit of the invention as set forth in the appended claims.

I claim:

1. A weighing device comprising a load-receiving member provided with an inclined surface along which an object to be weighed travels under the influence of gravity, a fixed support, and means operatively supporting said load-receiving member by said fixed support for establishing a measure of the weight of the moving object; said weight-establishing means having load-sensing means connected to said load-receiving member and to said fixed support to support said member in a vertical direction and including a substantially horizontal stay means extending substantially in the direction of the inclination of said surface, one end of the stay means being connected to said load-receiving member for staying the same against movement in the direction of the inclination, and compensating means connected to the other end of said stay means and engaging said fixed support so as to be operated by the force acting in said stay means to compensate for the reaction effect of the motion of the object being weighed, whereby the determination of weight of said moving object is made independent of forces resulting from its motion along said surface.

2. The combination set forth in claim 1 further characterized in that the load-sensing means for supporting said load-receiving member in a vertical direction includes vertically acting load cells located at each end of the load-receiving member and vertically connected thereto.

3. The combination set forth in claim 1 further characterized in that the means operated by the forces acting in the stay means includes a load cell responsive to the force in the stay means.

4. The combination set forth in claim 1 further characterized in that the means operated by the forces acting in the stay means includes a load cell responsive to the tension force in the stay means.

5. The combination set forth in claim 1 further characterized in that stay means and the fixed support therefor includes a bell crank pivotally mounted upon the fixed support and having substantially vertically and horizontally extending arms, and a horizontally extending connection from the vertical bell crank arm to the load-receiving member and a substantially vertically extending connection from the horizontal bell crank arm to the load-receiving member whereby the motion compensating effect is obtained.

References Cited in the file of this patent

UNITED STATES PATENTS

| | | |
|---|---|---|
| 2,571,113 | Crosby | Oct. 16, 1951 |
| 2,716,547 | Thurston | Aug. 30, 1955 |